United States Patent
Azulay et al.

(10) Patent No.: US 12,500,935 B2
(45) Date of Patent: Dec. 16, 2025

(54) MULTI-LAYER BROWSER-BASED CONTEXT EMULATION DETECTION

(71) Applicant: Microsoft Technology Licensing, LLC, Redmond, WA (US)

(72) Inventors: Itamar Azulay, Mishmar Ayalon (IL); Nitzan Frogel, Tel Aviv (IL); Meir Baruch Blachman, Beer-Sheva (IL); Tomer Cherni, Gany Tikva (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 275 days.

(21) Appl. No.: 18/066,842

(22) Filed: Dec. 15, 2022

(65) Prior Publication Data

US 2024/0205265 A1  Jun. 20, 2024

(51) Int. Cl.
*H04L 9/40* (2022.01)

(52) U.S. Cl.
CPC .............. *H04L 63/20* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 9,268,958 B1 | 2/2016 | Kessler | |
| 10,216,857 B2 | 2/2019 | Perret | |
| 10,860,351 B1 | 12/2020 | Lewin et al. | |
| 11,019,101 B2 | 5/2021 | Narayanaswamy et al. | |
| 11,425,569 B2 | 8/2022 | Akkad et al. | |
| 11,811,829 B2* | 11/2023 | Agarwal | G06F 21/62 |
| 2007/0220599 A1* | 9/2007 | Moen | H04L 63/168 |
| | | | 726/12 |
| 2014/0317489 A1 | 10/2014 | Lal et al. | |
| 2017/0264619 A1 | 9/2017 | Narayanaswamy et al. | |
| 2018/0096203 A1 | 4/2018 | King et al. | |
| 2020/0236102 A1* | 7/2020 | Azulay | H04L 67/02 |
| 2020/0358786 A1* | 11/2020 | Bergbom | H04L 63/20 |

OTHER PUBLICATIONS

"Content Security Policy", Retrieved From: https://web.archive.org/web/20161003202457/https://csp.withgoogle.com/docs/index.html, Retrieved Date: Oct. 3, 2016, 2 Pages.

(Continued)

*Primary Examiner* — Christopher C Harris
(74) *Attorney, Agent, or Firm* — Weaver IP L.L.C.

(57) ABSTRACT

Methods, systems and computer program products are provided for multi-layer, browser-based context emulation detection, which may be implemented by a proxy for browsers. A policy may be enforced against requests if a request context indicates a restricted context. Context may be detected and indicated in a response header and body based on one or more context detection/indication rules. Context may be indicated by marking or not marking resources indicated in responses. Code may be injected to cause the client web browser to indicate context. A response may be forwarded to the client with a response header context, a response body context, and/or injected code, which a client browser may process to generate a request with one or more indications of request context.

20 Claims, 5 Drawing Sheets

(56) References Cited

OTHER PUBLICATIONS

"Fetch Metadata Request Headers", Retrieved From: https://w3c.github.io/webappsec-fetch-metadata/, Jul. 20, 2021, 16 Pages.
"Fetch Metadata Request Headers", Retrieved From: https://web.archive.org/web/20201028045104/https://secmetadata.appspot.com/, Retrieved Date: Oct. 28, 2020, 1 Page.
"Sec-Fetch-Dest", Retrieved From: https://http.dev/sec-fetch-dest, Jun. 20, 2022, 10 Pages.
Andrew, et al., "url()", Retrieved From: https://developer.mozilla.org/en-US/docs/Web/CSS/url, Sep. 27, 2022, 4 Pages.
Anforowicz, Lukasz, "Sec-Fetch-Dest is not trustworthy #10", Retrieved From: https://github.com/w3c/webappsec-fetch-metadata/issues/10, Jan. 16, 2019, 3 Pages.
Aquariuslt, et al., "FetchEvent.respondWith()", Retrieved From: https://developer.mozilla.org/en-US/docs/Web/API/FetchEvent/respondWith, Sep. 13, 2022, 3 Pages.
Barua, et al., "Server Side Detection of Content Sniffing Attacks", In Proceedings of IEEE 22nd International Symposium on Software Reliability Engineering., Nov. 29, 2011, pp. 20-29.
Evans, Chris, "Generic cross-browser cross-domain theft", Retrieved From: https://scarybeastsecurity.blogspot.com/2009/12/generic-cross-browser-cross-domain.html, Dec. 28, 2009, 6 Pages.
Janc, et al., "Securing web apps with modern platform features", Retrieved From: https://webappsec.dev/assets/pub/Google_IO-Securing_Web_Apps_with_Modern_Platform_Features.pdf, 2019, 60 Pages.
Kesteren, Annev. , "Is Sec-Fetch-Dest necessary? #16", Retrieved From: https://github.com/w3c/webappsec-fetch-metadata/issues/16, Mar. 9, 2019, 10 Pages.
Rahman, et al., "Fetch metadata request header", Retrieved From: https://developer.mozilla.org/en-US/docs/Glossary/Fetch_metadata_request_header, Sep. 21, 2022, 2 Pages.
Timothygu, et al., "Sec-Fetch-Dest", Retrieved From: https://developer.mozilla.org/en-US/docs/Web/HTTP/Headers/Sec-Fetch-Dest, Sep. 9, 2022, 4 Pages.
Weichselbaum, Lukas, "Protect your resources from web attacks with Fetch Metadata", Retrieved From: https://web.dev/fetch-metadata/, Jun. 4, 2020, 12 Pages.
Wulf, Pierred. , "How to Use a Proxy With Node-Fetch?", Retrieved From: https://www.scrapingbee.com/blog/proxy-node-fetch/, Nov. 9, 2020, 10 Pages.
"HTTP headers—HTTP I MDN," Retrieved from the Internet: URL: https://web.archive.org/web/20221210232449/https://developer.mozilla.org/en-US/docs/Web/HTTP/Headers, Dec. 10, 2022, 21 Pages.
"Policy Enforcement with Proxy Applications," Retrieved from the Internet: URL: https://docs.tibco.com/pub/policydirector/1.0.1/doc/html/GUID-B940BB42-BC2D-4BE5-BE90-D46495856C90.html, May 22, 2014, 01 Page.
International Search Report and Written Opinion received for PCT Application No. PCT/US23/081055, Feb. 23, 2024, 12 pages.
International Preliminary Report on Patentability (Chapter I) received for PCT Application No. PCT/US23/081055, mailed on Jun. 26, 2025, 9 Pages.

* cited by examiner ns contained

MULTI-LAYER BROWSER-BASED CONTEXT EMULATION DETECTION

BACKGROUND

Client computing devices may be unmanaged or managed with respect to implementing security policies. For example, a user may use an unmanaged computing device to access a cloud resource (e.g., a Web application) providing access to one or more other resources (e.g., business files). Security policies may be implemented for the unmanaged client (e.g., unmanaged client and/or unmanaged Web browser application) such as by routing client-based browser activity through a proxy. Security policies may be avoided by security loopholes and/or by nefarious activity. For example, to thwart a policy that restricts downloading documents while permitting web surfing, which includes rendering Webpage resources that include images, a user could rename a document file, such as a .docx document file, to an image file, such as a .png image file, to download the document file disguised as an image file.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are provided for multi-layer, browser-based context emulation detection, which may be implemented by a proxy. Requests associated with client Web browsers are parsed into a request header and a request body. The request header is inspected for an indication of a request context. A policy may be enforced against the request, for example, if the indication of the request context indicates a restricted context (e.g., a download action rather than a webpage rendering resource). A response associated with a web server is received. The response is parsed into a response header and a response body, which may be inspected to detect (e.g., and indicate) context (e.g., for a subsequent request from the browser). Context interpretation and/or marking determinations may be made based on one or more context detection rules. Context (e.g., restricted and/or unrestricted) may be indicated by marking or not marking (e.g., resources in) the response header (e.g., to indicate a response header context) and/or the response body (e.g., to indicate a response body context, such as resource type). Code (e.g., JavaScript code) may be injected into a response. Injected code is configured to cause the client web browser to maintain and/or generate context in a (e.g., subsequent) request with at least a portion of request context (e.g., for dynamically generated request content and/or requests intercepted by service workers). A response is forwarded to the client with a response header context, a response body context, and/or injected code, which a client browser may process to generate a request with one or more indications of request context.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only.

Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
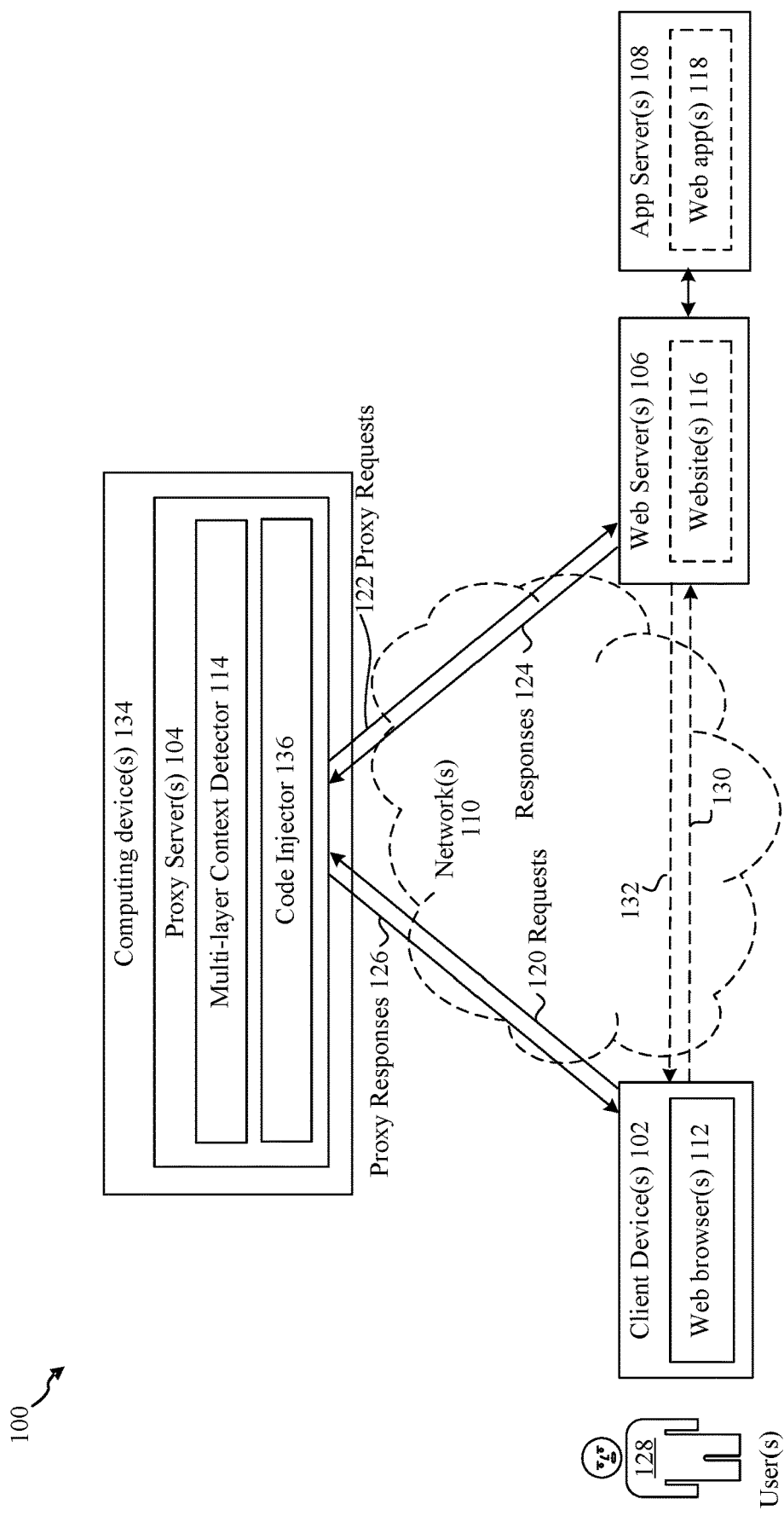
FIG. 1 shows a block diagram of an example computing environment for multi-layer, browser-based context emulation detection, according to an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

As noted in the Background Section, above, client computing devices may be unmanaged or managed (e.g., controlled, such as by server agents), for example, with respect to implementing security policies. For example, a user may use an unmanaged computing device to access a cloud resource (e.g., a Web application) providing access to one or more other resources (e.g., business files). Security policies may be implemented for the unmanaged client (e.g., unmanaged client and/or unmanaged Web browser application), for example, by routing client-based browser activity through a proxy. Security policies may be avoided by security loopholes and/or by nefarious activity. For example, to thwart a policy that restricts downloading documents while permitting web surfing, which includes rendering Webpage resources, including images, a user could rename a document file, such as .docx, to an image file, such as .png, to download the document file.

Methods, systems and computer program products are provided for multi-layer, browser-based context emulation detection, which may be implemented by a proxy for (e.g., unmanaged) browsers. A policy may be enforced against requests if a request context indicates a restricted context (e.g., a download action rather than a webpage rendering). Context may be detected and indicated in a response header and body based on one or more context detection/indication rules. Context may be indicated by marking or not marking resources indicated in responses. Code (e.g., JavaScript library) may be injected to cause the client web browser to indicate context (e.g., for dynamically generated request content and/or requests intercepted by service workers). A response may be forwarded to the client with a response header context, a response body context, and/or injected code, which a client browser may process to generate a request with one or more indications of request context.

Web proxies may be used to intercept and edit client-side JavaScript code running in (e.g., unmanaged) client browsers, for example, to monitor actions (e.g., on the client-side) through policy evaluation (e.g., file upload or download actions that occur in the browser without an indication to the server). For example, suffix proxies (e.g., proxy services that modify the URLs (uniform resource locators) of their target applications) may modify JavaScript navigation and asynchronous JavaScript and XML (extensible markup language), such as AJAX (asynchronous JavaScript and XML), client-side actions to suffix or un-suffix URLs.

Proxy services may hook relevant places, for example, by modifying the JavaScript code received from a Webserver (e.g., an original application running on a Webserver) before the code reaches the client. Proxy services may parse code and insert "hooks" in places marked as relevant (e.g., in navigation events, AJAX, download, upload, etc.). Parsing, hooking and rebuilding JavaScript files may be a resource-intensive task (e.g., minutes to complete for large JavaScript files). As a Proxy service expands to more users, analyzing and modifying code may become a significant bottleneck, e.g., for processors, caches, cache distribution, load balancing, etc.

Proxy services may seek to determine the context that a request originated from or is responded to. A context may be, for example, the basis for a browser rendering mechanism determination, such as whether to render code, download a potential document, display an image to the user interface (UI), etc.

In an example, a PDF document downloaded from an <a> tag may not be treated the same as an <iframe>. The <a> context may cause a file download while an <iframe> may render the file in the UI and preview it. Thus, tags in XML code may be used to determine file treatment.

A browser rendering mechanism/mapping may determine decision-making in terms of how to handle resources provided (e.g., by a Web app running on a Web server) in response to requests.

In an example, a security policy may seek to prevent sensitive data from being downloaded to unmanaged client devices. A malicious user might rename a .DOCX file to a .PNG extension and upload the file to a file share app (e.g., OneDrive for Business or Google Drive). The file renaming may cause the file to be recognized as an image, which may bypass tenant policies to block sensitive data from being downloaded to unmanaged devices (e.g., due to the file extension being wrongly translated to an image content-type).

A multi-layer detection mechanism may extract (e.g., an accurate) context to assist server-side (e.g., proxy) detection of the origin of activity, for example, so that the correct policy may be enforced (e.g., by a cloud operator on behalf of a tenant attempting to protect tenant information). Multi-layer context detection may emulate context without installing a management agent/on a client device. Multi-layer context detection may be performed based on client/server web manipulation.

Multi-layer context detection may detect context at multiple layers, such as for requests (e.g., request header, request body) and responses (e.g., response header, response body). For example, multilayer detection may include context detection and/or indication at one or more of the following levels: (1) during response manipulation for HTMLs, e.g., by providing server-side request marking of URLs to correlate to HTML tags; (2) during response manipulation for stylesheets, e.g., by providing server-side request marking of URLs to indicate a style context (e.g., renderable by a client browser); (3) during dynamic JS DOM manipulation, e.g., by providing client-side request marking of URLs to correlate to HTML tags, such as if/when a dynamic HTML tag is created; (4) during a request inspection phase, e.g., by providing server-side detection for a request destination, such as based on a fetch metadata request header; and/or (5) during (e.g., application-based) service worker manipulation, e.g., by injecting client-side code to maintain a correct request context, including for requests that may be captured by a service-worker.

Multi-layer context detection may provide advantages, such as improving the accuracy of policy enforcement for a wide variety of clients, including unmanaged clients (e.g., without installing an agent on a client). Performing context detection at multiple layers allows detection to overlap or compensate for loopholes that may exist at another layer, which improves context detection, including malicious attempts to conceal restricted activity. Multi-layer context detection may provide (e.g., full) browser context emulation, e.g., by mocking a browser rendering engine without being a browser.

In examples, an HTML document and/or URL may be parsed, e.g., layer by layer, to determine a context (e.g., associated with an activity and/or file that is or may be identified in a request). A server may indicate the context in a response, return the response to the client, inject proxy JavaScript code (e.g., as needed) to maintain and/or provide context indications, receive and analyze a (e.g., follow-up/subsequent) request with the context indications, enforce policies against requests based on the indications, and repeat the process for each request and response. Various requests from a variety of clients may or may not include fetch metadata request headers, which may allow a server to (e.g., at least partially) map to a context relevant to policy enforcement. The multi-layer context indication and detection enables a (e.g., proxy) server to detect the origin of activities so that the correct policy can be enforced for activities and/or resources (e.g., files). Parsed content may be compared with (e.g., predefined) rules that indicate restricted and/or unrestricted activities (e.g., page rendering versus download actions) and/or types of resources (e.g., rendering resources versus potentially malicious data). For example, a fetch metadata request may (e.g., be used to) obtain data from a request header. A proxy server may add response data (e.g., marks, tags or other indications with or without marking depending on the proxy interpretation configuration) to the response header and/or body. Context indications may indicate a determination about how a browser may render a retrieved response file (e.g., a context for rendering when the file content does not match its file type). For example, the content of a file may be text, such that the file should have a consistent file extension (e.g., .docx). A malicious actor may have changed the file extension to .png to indicate that the file is an image file. A proxy may be configured to parse the content of the file regardless of the file extension, for example, to determine possible malicious content and/or activity (e.g., an attempt to skirt a policy against downloading .docx files). The proxy may perform mitigation on the server-side and/or on the client-side, e.g., depending on the context detection. For example, the proxy may return a response received from a Web server to the client with proxy JavaScript code injected for mitigation (e.g., to maintain a context indicated in a response and/or to add a context indication that may be detected by the proxy to enforce policies based on the detected context of requests).

Embodiments may be implemented in a variety of systems/environments. For example, FIG. 1 shows a block diagram of an example computing environment 100 for multi-layer, browser-based context emulation detection, according to an embodiment. Other configuration of multi-layer, browser-based context emulation detection may be implemented. As shown in FIG. 1, computing environment 100 includes one or more client devices 102, one or more computing devices 134 that each include one or more proxy servers 104, one or more web servers 106, and one or more app servers 108, which may be communicatively coupled, for example, directly and/or indirectly, e.g., via one or more networks 110. Each client device 102 includes one or more web browsers 112. Each proxy server 104 includes a multi-layer context detector 114 and a code injector 136. Each web server 106 includes one or more websites 116. Each app server 108 includes one or more web apps 118. Computing environment 100 may be any computing environment (e.g., any combination of hardware, software, and firmware). An example computing device with example features for client device(s) 102, computing device(s) 134 (including proxy server(s) 104), web server(s) 106, and app server(s) 108 is presented in FIG. 6.

Network(s) 110 may include one or more public access and/or restricted (e.g., private) access networks, which may be wired and/or wireless. Network(s) 110 may include one or more of any of a local area network (LAN), a wide area network (WAN), a personal area network (PAN), a combination of communication networks, such as the Internet, and/or a virtual network. In example implementations, user client device(s) 102, computing device(s) 134 (including proxy server(s) 104), and web (e.g., website or content) web server(s) 106 may be communicatively coupled via network(s) 110. In an implementation, any one or more of user client device(s) 102, proxy server(s) 104, web server(s) 106 may communicate (e.g. via network(s) 110) via one or more application programming interfaces (APIs), and/or according to other interfaces and/or techniques. User client device(s) 102, computing device(s) 134 (including proxy server(s) 104), and web (e.g., website or content) server(s) 106 may each include at least one network interface that enables communications with each other. Examples of network interfaces, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Web server(s) 106 may comprise one or more virtual machines, storage devices, servers, operating systems, applications, services, local processes, remote machines, web services, etc. that may be executed, hosted, and/or stored therein or via one or more other computing devices via network(s) 110. Web server(s) 106 may represent any number of computing devices. Web server(s) 106 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Web server(s) 106 are not limited to physical machines, but may include other types of machines or nodes, such as a virtual machine. Web server(s) 106 may include and/or may be communicatively coupled to one or more storage devices that store resources and/or other content that may be indicated and/or provided in a response to a request. Resources and/or other content may be in the form of HTML, style sheets, JavaScript, image files, audio files, video files, etc.

Web server(s) 106 may host/serve (e.g., tenant) website(s) 116, web app(s) 118, etc. Web server(s) 106 may serve any type of website or web application with any type of statically or dynamically generated content, such as search engines, news, content entry/editing applications, content management applications, entertainment, product/service sales, social media, etc.

Web server(s) 106 may be communicatively coupled (e.g., directly or indirectly) to and/or may (e.g., also) operate as app server(s) 108, which may include web app(s) 118. Web applications (e.g., "web apps" or "webapps"), such as web application(s) 118, are applications accessible over network(s) 110 (e.g., Internet). Web app(s) 118 may be hosted in web browser(s) that render the web application(s). Example applications include search engines, word processing applications, database applications, social networking applications, navigational assistance applications (e.g., mapping applications, restaurant locating applications, traffic applications, etc.), gaming applications, financial planning applications, etc.

App server(s) 108 may comprise one or more virtual machines, storage devices, servers, operating systems, applications, services, local processes, remote machines, web services, etc. that may be executed, hosted, and/or stored therein or via one or more other computing devices via network(s) 110. Web server(s) 106 may represent any number of computing devices. Web server(s) 106 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Web server(s) 106 are not limited to physical machines, but may include other types of machines or nodes, such as a virtual machine. App server(s) 108 may include and/or may be communicatively coupled to one or more storage devices that store resources and/or content that may be indicated and/or provided in a response to a request. Resources and/or other content may be in the form of HTML, style sheets, JavaScript, image files, audio files, video files, etc.

Web server(s) 106 may process requests and responses, which may be in the form of hypertext markup language (HTML). Web server(s) 106 may receive and process requests 130 from client device(s) 102 or proxy requests 122 from proxy server(s) 104. Whether requests from client device(s) 102 pass through proxy server(s) 104 may depend whether user(s) website(s) 116 and/or web app(s) 118 are restricted to access at least via proxy server(s) 104). Web server(s) 106 may (e.g., in response to the request) generate and send responses 132 to client device(s) 102 and responses 124 to proxy server(s) 104.

For example, requests 130 and proxy requests 122 may indicate an HTML page, style sheet, image(s), code (e.g., JavaScript code), data (e.g., extensible markup language (XML) file, JavaScript Object Notation (JSON) file), etc. for a uniform resource locator (URL) address associated with a webpage in website 116. Responses 132 to client device(s) 102 or responses 124 to proxy server(s) 104 may respond to the respective request, for example, by providing the requested HTML page, style sheet, image(s), code, data, etc.

Client device(s) 102 may comprise one or more virtual machines, storage devices, servers, operating systems, applications, services, local processes, remote machines, web services, etc. that may be executed, hosted, and/or stored therein or via one or more other computing devices via network(s) 110. Client device(s) 102 may represent any number of computing devices. Client device(s) 102 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Client device(s) 102 are not limited to physical machines, but may include other types of machines or nodes, such as a virtual machine. Client device(s) 102 may include and/or may be communicatively coupled to one or more storage devices.

Client device(s) 102 may include web browser(s) 112. Web browser(s) 112 may comprise, for example, general or specific browsing applications, such as Web browser applications that may be used to render public and/or private content (e.g., based on providing authorized user credentials) for one or more content providers (e.g., cloud service tenants). Web browser(s) 112 may be managed or unmanaged browsers. Web browser(s) may render website(s) 116 and/or web app(s) 118 on client device(s) 102. User(s) 128 may view, select and/or interact with rendered website(s) 116 and/or web app(s) 118. For example, user(s) 128 may enter URLs in web browser(s) 112 and/or select (e.g., links to) URLs in content rendered by web browser 112.

For example, a user may select a link on a page to download or a user may right click a link to copy (e.g., download) a file associated with the link. Proxy server(s) 104 may detect the context (e.g., user actions) and enforce one or more policy restrictions, for example, to block the download action or convert the download action into a different action, such as rendering the file associated with the link (e.g., a document or image) in a new browser tab. A policy restriction may block or convert download actions, for example, for copyright and/or information security reasons.

As shown in FIG. 1, client device(s) 102 may send and receive requests 130 to web server(s) 106 and/or requests 120 to proxy server(s) 104 depending whether website(s) 116 and/or web app(s) 118 are restricted to access at least via proxy server(s) 104). For example, client device(s) 102 may include unmanaged devices using any type of web browser(s) 112. Requests 120 may be routed to proxy server(s) 104, for example, if/when user(s) 128 of client device(s) 102 are logged into a cloud service operating web server(s) 106 (e.g., and app server(s) 108) to provide access to restricted (e.g., private, secured, or tenant) website(s) 116 and/or web app(s) 118. Non-proxy requests 130 and responses 132 may be routed to web server(s) 106 without passing through proxy server(s) 104, for example, if/when user(s) 128 of client device(s) 102 are not logged into a cloud service attempting to access restricted/private web server(s) 106 (e.g., and app server(s) 108).

Proxy server(s) 104 may comprise one or more virtual machines, storage devices, servers, operating systems, applications, services, local processes, remote machines, web services, etc. that may be executed, hosted, and/or stored therein or via one or more other computing devices, e.g., via network(s) 110. Proxy server(s) 104 may represent any number of computing devices. Proxy server(s) 104 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Proxy server(s) 104 are not limited to physical machines, but may include other types of machines or nodes, such as a virtual machine. Proxy server(s) 104 may include and/or may be communicatively coupled to one or more storage devices.

Proxy server(s) 104 may provide one or more proxy services for traffic between client device(s) 102 and web server(s) 106. For example, proxy server(s) 104 may operate as a security intermediary between client device(s) 102 and web server(s) 106. In examples, proxy server(s) 104 may receive requests 120, generate proxy requests 122, receive responses 124, and generate proxy responses 126. Proxy server(s) 104 may generate and send/forward proxy requests 122 to web server(s) 106, e.g., based on receiving requests 120. Proxy server(s) 104 may receive responses 124 from web server(s) 106, e.g., in response to proxy requests 122. Proxy server(s) 104 may generate and send proxy responses 126 to client device(s) 102, e.g., in response to receiving responses 124. Whether requests from client device(s) 102 pass through proxy server(s) 104 may depend whether website(s) 116 and/or web app(s) 118 are restricted to access at least via proxy server(s) 104 and whether user(s) 128 have sought and received access authorization thereto.

Multi-layer context detector 114 processes (e.g., HTML) requests and responses, for example, to enforce one or more policies pertaining to access to web server(s) 106 and/or app server(s) 108. In support of policy enforcement, multi-layer context detector 114 may emulate web browser(s) 112, for example, to determine the request context of current requests 120 and subsequent (e.g., expected) requests 120 generated subsequent to receiving proxy responses 126. Browser emulation may support layered context tracking and predictive (e.g., future) request context determinations, which may be indicated in proxy responses 126 for interpretation and detection in any future requests 120.

Multi-layer context detector 114 may generate proxy responses 122 with context indicators (e.g., contextualized (e.g., marked up) versions of responses 124). Context indications/marking may be performed on responses 124, for example, if subsequent processing of the response by browser(s) 112 may trigger more requests. Web browser(s) 112 may generate initial and subsequent requests 120 to render website(s) 116 and/or web app(s) 118, for example, based on the responses 124 and/or based on action(s) by user(s) 128. Request(s) 120 may include context that proxy server(s) 104 generated in proxy responses 126 and/or context that web browser(s) 112 generated based on proxy code injected by code injector 136 of proxy server(s) 104 into proxy responses 126. For instance, code injector 136 may be configured to insert program code (e.g., one or more lines of code) into the code of proxy response 126, such as in a header and/or body of a proxy response. Contextualization (e.g., mark ups) and/or policy enforcement provided by multi-layer context detector 114 may be general (e.g., for multiple users) or specific (e.g., for a particular user, such as based on user authorization).

For example, requests 130 and responses 124 may indicate an HTML page, style sheet, image(s), code (e.g., JavaScript code), file (e.g., XML file, JSON file), etc. for a URL address associated with a webpage in website(s) 116 or web app 118 from app server(s) 108. Multi-layer context detector 114 may indicate context and detect indications of context, for example, based on one or more of the HTML, style sheet, image(s), code, file, etc. in requests 120 and responses 124. Multi-layer context detector 114 may enforce one or more policies based on the indicated and/or detected context.

Figure 2:
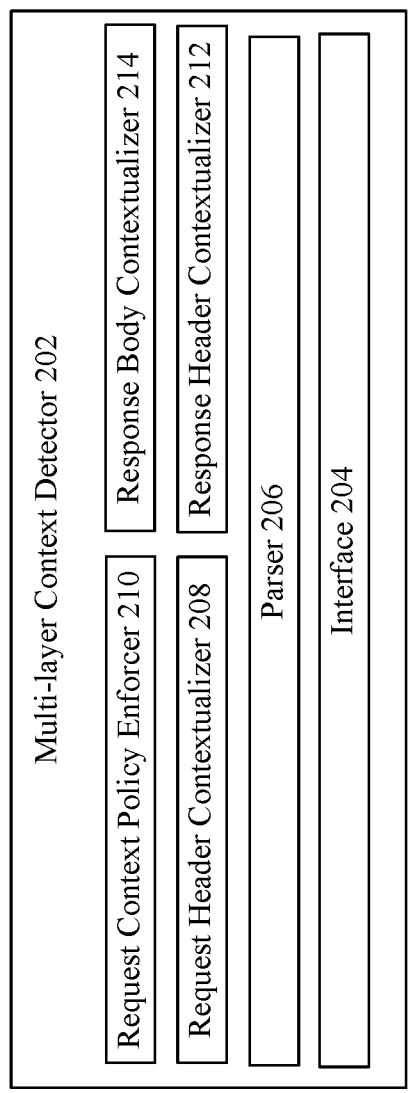
FIG. 2 shows a block diagram of an example multi-layer context detector and policy enforcer, according to an embodiment.

Multi-layer context detector 114 may be configured in various ways in embodiments. For instance, FIG. 2 shows a block diagram example of a multi-layer context detector 202, according to an embodiment. As shown by example in FIG. 2, multi-layer context detector 202 may include, for example, an interface 204, a parser 206, a request header contextualizer 208, a request context policy enforcer 210, a response header contextualizer 212, and a response body contextualizer 214. FIG. 1 shows one of many possible implementations, in which proxy server(s) 104 and/or multi-layer context detector 202 may include the same, similar, or different numbers, names, and/or functional components relative to the example in FIG. 1.

Interface 204 is a communication interface configured to receive and queue requests 120 of FIG. 1 associated with (e.g., originating from, received directly or indirectly from) client web browser(s) 112. Requests 112 may include a request header and a request body. Interface 204 may receive, queue, and transmit (e.g., towards web server(s) 106) proxy requests 122 generated by multi-layer context detector 202. Interface 204 may receive and queue responses 124 associated with web server(s) 106 responding to proxy requests 122. Responses 124 may include a response header and a response body. Interface 204 may receive, queue, and transmit (e.g., towards client device(s) 102) proxy responses 126 generated by multi-layer context detector 202.

Parser 206 is configured to parse requests 120 into the request header and request body, e.g., for context detection and/or indication. Parser 206 parses responses 124 into the response header and response body, e.g., for context detection and/or indication. Parser 206 may further parse headers and bodies, for example, based on the type of content, e.g., HTML, CSS, Javascript content. Examples are provided herein.

Request Header Contextualizer 208 analyzes request headers to inspect/interpret, detect, indicate (e.g., mark or not mark) and/or map context (e.g., the context of requests 120). Request headers may indicate a destination/target web server and/or app server. Request headers may or may not indicate context. Context detection and indication may be driven by policies. For example, a policy may indicate requests for webpage rendering resources are unrestricted (e.g., allowed) while requests for download actions are restricted (e.g., not allowed). Various implementations may use any number and type of policies, with associated context detections and indications to enforce the policies.

An initial request may be an HTML request without context markings. Subsequent requests (e.g., made based on a marked response) may be HTML or another type of request from the browser. A request may include a fetch metadata request header. A fetch metadata request header may be an HTTP request header that provides information about the context from which the request originated, which may allow proxy server(s) 104 to detect and/or indicate context, such as the source and/or use of a request.

Request Header Contextualizer 208 may (e.g., be configured to) receive mixed requests with and without fetch metadata request headers. If a request includes a fetch metadata request header, Request Header Contextualizer 208 may map the value of the sec-fetch-dest request header into an appropriate context that may otherwise be indicated by Request Header Contextualizer 208 in a proxy response that pre-marks context for subsequent requests.

Requests may include context indications associated with each resource. The context indications may (e.g., alone or in combination) indicate context, such as whether the resource is for a download action or a resource for webpage rendering. Requests 120 may have context indications (e.g., a context query string). If a request is already marked with context (e.g., because it was generated based on a proxy response with context indications), Request Header Contextualizer 208 may detect the context, e.g., relative to one or more policies to the request. For example, a policy may indicate that a request with a context query string having a value of XMLHttpRequest may not be processed (e.g., may not be forwarded to web server(s) 106 for a response) because the request is not for a webpage rendering resource.

Request context policy enforcer 210 may apply (e.g., enforce) one or more policies against requests based on the context detected by Request Header Contextualizer 208. For example, a request with a context query string having a value of XMLHttpRequest may not be processed (e.g., may not be forwarded to web server(s) 106) for a response based on a policy restricting responses to requests for webpage rendering resources.

If request 120 is permitted based on the one or more policies, or if request 120 is an initial (e.g., HTML) request, response parser 128 may send the request upstream as proxy request 124 towards the destination/target web server(s) 106 to obtain a response. Interface 204 may receive the response 124. Parser 206 may parse response 122 into response header and response body for contextualization.

Response header contextualizer 212 may analyze response headers to inspect/interpret, detect, indicate (e.g., mark or not mark) and/or map context (e.g., from the perspective of potential future requests 120). Context may be determined/indicated, for example, from the perspective of how a subsequent request may be sent out as request 120. Response header context detection and indication may be driven by policies. For example, a policy may indicate requests for webpage rendering resources are unrestricted (e.g., allowed) while requests for one or more download actions are restricted (e.g., not allowed). For example, download actions may be distinguished from webpage rendering actions. In examples, context may indicate what triggered browser 102 to make/send request 120. Context may indicate, for example, whether user(s) 128 navigated to an image on website 116, e.g., indicating an intent to download an image, or whether the image is fetched using an image tab, e.g., indicating the image is part of website 116.

Resources indicated in response headers may be distinguished (e.g., by marking and/or not marking) whether the resources are webpage rendering resources (e.g., HTML, CSS, JavaScript resources) or not. Response header contextualizer 212 may mark a response body, for example, by marking URLs in HTML tags with a context, e.g., an indication of script (e.g., JavaScript), CSS, or image resources. In some examples, resources that are not used for webpage rendering may not be marked, e.g., or vice versa. HTML may or may not be marked, for example, because a download of HTML may simply download a renderable web page. In some examples, there may not be any marking, e.g., based on the configuration of Request Header Contextualizer 208. Various implementations may use any number and type of policies, with associated context detections and indications to enforce the policies.

In some examples, a navigation/location response header may be indicated (e.g., marked) as a navigation (e.g., "NAVIGATE") resource, for example, if the response status code is a redirect HTTP status code (e.g., a 3 series status code, such as 3**). In some examples, if a response header includes a Link response header field (e.g., to serialize one or more links, which may be semantically equivalent to HTML), the header may be processed in accordance with an HTTP specification for Link indicated by the Mozilla Developer Network (MDN).

Response body contextualizer 214 may analyze response bodies to inspect/interpret, detect, indicate (e.g., mark or not mark) and/or map context (e.g., from the perspective of potential future requests 120). Context may be determined/indicated, for example, from the perspective of how a subsequent request may be sent out as request 120. Response body context detection and indication may be driven by policies. For example, a policy may indicate requests for webpage rendering resources are unrestricted (e.g., allowed) while requests for one or more download actions are restricted (e.g., not allowed). For example, download actions may be distinguished from webpage rendering actions. Resources indicated in response bodies may be distinguished (e.g., by marking and/or not marking) whether the resources are webpage rendering resources (e.g., HTML, CSS, Javascript resources) or not. In some examples, resources that are not used for webpage rendering may not be marked, e.g., or vice versa. HTML may or may not be marked, for example, because a download of HTML may simply download a renderable web page. In some examples, there may not be any marking, e.g., based on the configuration of Request Header Contextualizer 208. Various implementations may use any number and type of policies, with associated context detections and indications to enforce the policies.

In some examples, response body contextualizer 214 may indicate context for HTML content, CSS content, JavaScript content, etc. In an example of HTML content, such as if/when the response multipurpose internet mail extensions (MIME) type represents HTML, parser 206 may parse the response body text into an HTML abstract syntax tree (AST). Response body contextualizer 214 may traversed the AST for each HTML node. Response body contextualizer 214 may call a context-resolver function to mark the URL with the (e.g., appropriate) context.

For example, URLs in the following HTML tags may be marked by response body contextualizer 214 as script (e.g., "SCRIPT") resources:

```
<script src="https://cdn.office.com/script.js"></script>
<link as="script" href="https://cdn.office.com/script.js">
...
```

The URL in the following HTML tags may be marked as cascading style sheet (CSS) resources:

```
<link rel="stylesheet" href="https://cdn.office.com/style.css">
...
```

The URLs in the following HTML tags may be marked as image (e.g., "IMAGE") resources:

```
<div style="background: url(https://cdn.office.com/image.png)"></div>
<img src="https://cdn.office.com/" />
...
```

Response body contextualizer 214 (e.g., a context-resolver function) may determine (e.g., calculate) the resource types for resources (e.g., URLs), for example, based on an HTML standard.

In an example of CSS content, if/when the response MIME type represents a cascading style sheets, parser 206 may parse the response body text into a CSS AST. Response body contextualizer 214 may traverse the AST for each CSS rule that uses the URL( ) CSS function. Response body contextualizer 214 may call a context-resolver function to mark the URL with the (e.g., appropriate) context.

For example, URLs in the following example may be marked as CSS resources:

```
url (https://example.com/images/myImg.jpg) ;
url (data:image/png;base64, iRxVB0...);
url (myFont.woff);
url (#IDofSVGpath);
/* associated properties */
background-image: url ("star.gif");
list-style-image: url (' . ./images/bullet.jpg' 0:
content: url (mycursor.cur);
border-image-source: url (/media/diamonds.png);
src: url ('fantasticfont.woff');
offset-path: url (#path);
mask-image: url ("masks.svg#mask1");
/* Properties with fallbacks */
Cursor: url(pointer.cur), pointer;
/* Associated short-hand properties */
```

```
Background: url("star.gif") bottom right repeat-x blue;
Border-image: url("/media/diamonds.png") 30 fill / 30px / 30px space;
. . .
```

There may be exceptions to contextualization. For example, the @namespace rule may not be indicated (e.g., marked) because it represents the namespace of the elements for application of the style.

Context marking may occur in the proxy and/or in the client browser, for example, based on added and/or modified (e.g., collectively referred to as injected) code (e.g., JavaScript). Proxy JavaScript code may be injected by code injector 136, for example, (e.g., only) if a response is an HTML response (e.g., a response likely to spawn subsequent requests by a browser).

In an example of JavaScript content, e.g., if/when the response MIME type represents a JavaScript resource, parser 206 may parse the response body text into a JavaScript AST. Response body contextualizer 214 may traverse the AST for each JavaScript node. Response body contextualizer 214 may add or modify code/script (e.g., collectively referred to as injected code/script) using code injector 136 of FIG. 1, for example, by replacing a (e.g., relevant) expression with a contextualizer function. Injected code (e.g., contextualizer function) logic of the injected code may handle (e.g., as web browser(s) 112 process proxy responses 126) marking URLs on the client-side to maintain server-side context indications and/or to generate client-side context marking for dynamically generated content.

For example, URLs in the following example may be marked (e.g., on the client-side via injected code) as JavaScript resources:

```
navigator.serviceWorker.register('/service-worker.js');
new Worker('/worker.js');
. . .
```

URLs in the following example may be marked (e.g., on the client-side via injected code) as HTML resources:

```
var iframe = document.createElement('iframe');
iframe.src = '/embedded-frame.html';
document.body.appendChild(iframe);
window.open('/new-tab.html');
. . .
```

URLs in the following example may be marked (e.g., on the client-side via injected code) as IMAGE resources:

```
import data from '/data.json' assert { type: 'json' }
var data = await fetch('/data.json');
var XHR = new XMLHttpRequest
xhr.open('GET', '/data.json');
xhr.send( );
. . .
```

In some examples, JavaScript content may run within the scope of a service worker (e.g., ServiceWorker), which may behave like a proxy in terms of capability to intercept and modify navigation and resource requests. As shown in the following example, a fetch API may be used inside a function:

```
addEventListener('fetch', function (event) {
    event.respondWith(fetch(event.request));
});
. . .
```

A fetch event may indicate an HTTP request. Response body contextualizer 214 may use the value of the destination, e.g., the value that was originally sent out for the request. Response body contextualizer 214 may mark the URL with the value that appeared on the request destination, for example, so that the proxy server will see the marking, limit/restrict activity, and/or be able to determine whether there was a change in value of the destination.

For example, a browser (e.g., web browser 112) may send a request with the request header "sec-fetch-dest: empty." Response body contextualizer 214 may propagate the event.request.destination and mark the request-URL with the originally requested destination value, for example, if/when using the fetch API inside the FetchEvent.respondWith( ). The respondWith( ) method of FetchEvent may prevent a browser's default fetch handling, allowing response body contextualizer 214 (e.g., via injected code execute on the client side browser) to provide substitute fetch handling.

As shown in the following example, a cache API may be used inside a service worker:

```
addEventListener('install', function (event) {
    event.waitUntil(cache.addAll([
        'script.js',
        'style.css',
        'image.png',
        'index.html'
    ]));
});
. . .
```

Response body contextualizer 214 may (e.g., via injected code executed on the client-side browser) mark resources as (e.g., potential) JavaScript resources. The server-side (e.g., proxy server(s) 104) may handle the resources based on their content-type response header, for example, if/when using cache APIs inside a service worker.

A JavaScript client-side component (e.g., injected code) may maintain and/or generate marking inside the client-side browser, for example, for scenarios involving JavaScript, which may include service workers and/or dynamically generated content. Injected JavaScript code may monitor and override/substitute, for example, according to functions defined in the (e.g., modified and/or added) JavaScript component.

JavaScript resources in a web page may be modified (e.g., rewritten, such as by replacement and/or addition) to perform client-side contextualization. Dynamic web pages may load resources over time. The dynamically loaded resources may be marked by the injected code. A job resource may be modified, for example, so that when it executes on the client-side browser it loads contextually indicated (e.g., marked) resources.

JavaScript code may be injected into the browser, for example, so that dynamic activities go through (e.g., are managed by) proxy-injected JavaScript in the browser. Response headers may be processed by response header contextualizer 212 to extract information about the response. Response body contextualizer 214 may process the response body, for example, if header processing indicates the body includes relevant content types that may spawn subsequent requests.

Figure 3:
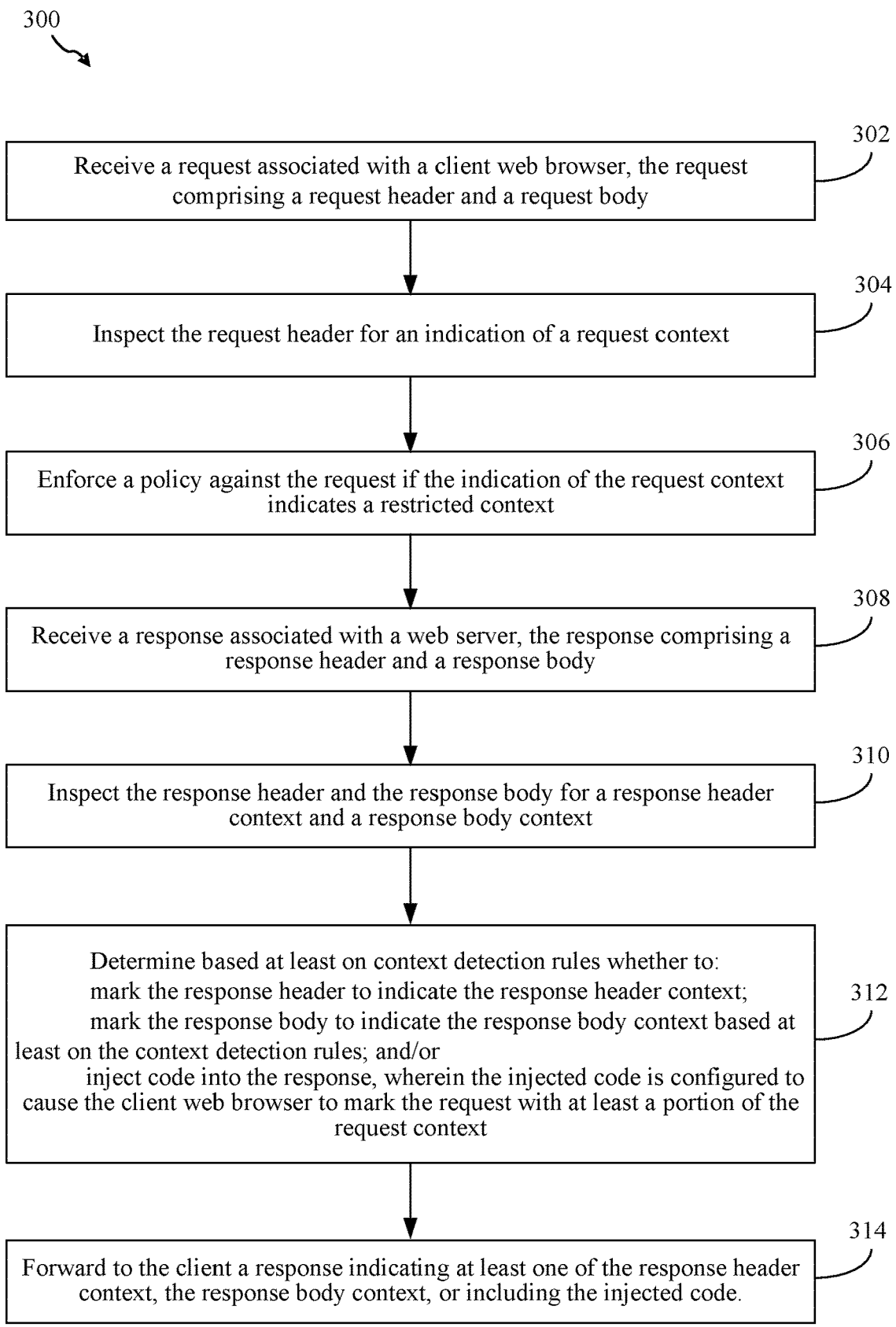
FIG. 3 shows a flowchart of a method for multi-layer browser-context emulation, detection and policy enforcement, according to an example embodiment.

FIG. 3 shows a flowchart of a method 300 for multi-layer browser-context emulation, detection and policy enforcement, according to an example embodiment. Embodiments disclosed herein and other embodiments may operate in accordance with example method 300. Method 300 comprises steps 302-314. However, other embodiments may operate according to other methods. Other structural and operational embodiments will be apparent to persons skilled in the relevant art(s) based on the foregoing discussion of embodiments. No steps are required unless expressly indicated or inherently required. No order of steps is required unless expressly indicated or inherently required. There is no requirement that a method embodiment implement all of the steps illustrated in FIG. 3. In various implementations, steps may be added, removed, implemented in the alternative, e.g., in any combination or order. FIG. 3 is simply one of many possible embodiments. Embodiments may implement fewer, more or different steps.

As shown in FIG. 3, in step 302, a request associated with a client web browser may be received. The request may include a request header and a request body. For example, as shown in FIG. 1, proxy server(s) 104 may receive requests 120 from client device(s) 102 executing web browser(s) 112.

As shown in FIG. 3, in step 304, the request header may be inspected for an indication of a request context. For example, as shown in FIGS. 1 and 2, multi-layer context detector 114 (e.g., request header contextualizer 208 shown in FIG. 2) may inspect requests 120 for request context.

As shown in FIG. 3, in step 306, a policy may be enforced against the request if the indication of the request context indicates a restricted context. For example, as shown in FIG. 2, request context policy enforcer 210 may enforce one or more policies against requests 120 if one or more request contexts detected by request header contextualizer 208 indicate a restricted context according to the one or more policies.

As shown in FIG. 3, in step 308, a response may be received that originates from a web server. The response may include a response header and a response body. For example, as shown in FIG. 1, proxy server(s) 104 may receive responses 124 from web server(s) 106 in response to requests 120 forwarded (e.g., with or without modification) as proxy requests 122.

As shown in FIG. 3, in step 310, the response header and the response body may be inspected for a response header context and a response body context. For example, as shown in FIGS. 1 and 2, multi-layer context detector 114 (e.g., response body contextualizer 212 and response header contextualizer 214 shown in FIG. 2) may inspect responses 124 for request context that includes a response header context and a response body context.

As shown in FIG. 3, in step 312, a determination may be made, based at least on context detection rules, whether to: (i) mark the response header to indicate a response header context; (ii) mark the response body to indicate a response body context based at least on the context detection rules; and/or (iii) inject code into the response. The injected code (e.g., injected by code injector 136) may be configured to cause the client web browser to mark the request with at least a portion of the request context. For example, as shown in FIG. 2, response header contextualizer 212 may determine (e.g., based on one or more context indication rules) whether to indicate context (e.g., for one or more resources) in the header of responses 224. Response body contextualizer 214 may determine (e.g., based on one or more context indication rules) whether to indicate context (e.g., for one or more resources) in the body of responses 224. Response header contextualizer 212 may determine (e.g., based on one or more context indication rules) whether to indicate context (e.g., for one or more resources) in the header of responses 224 and code injector 136 may inject code into the response to perform client-side context marking (e.g., to maintain context for service workers and/or to generate context for dynamically generated content).

As shown in FIG. 3, in step 314, a response indicating at least one of the response header context, the response body context, or including the injected code may be forwarded to the client. For example, as shown in FIGS. 1 and 2, interface 204 may send proxy responses 126 (e.g., context marked proxy responses 122), with or without injected code as determined in step 312, towards client device(s) 102.

Figure 4:
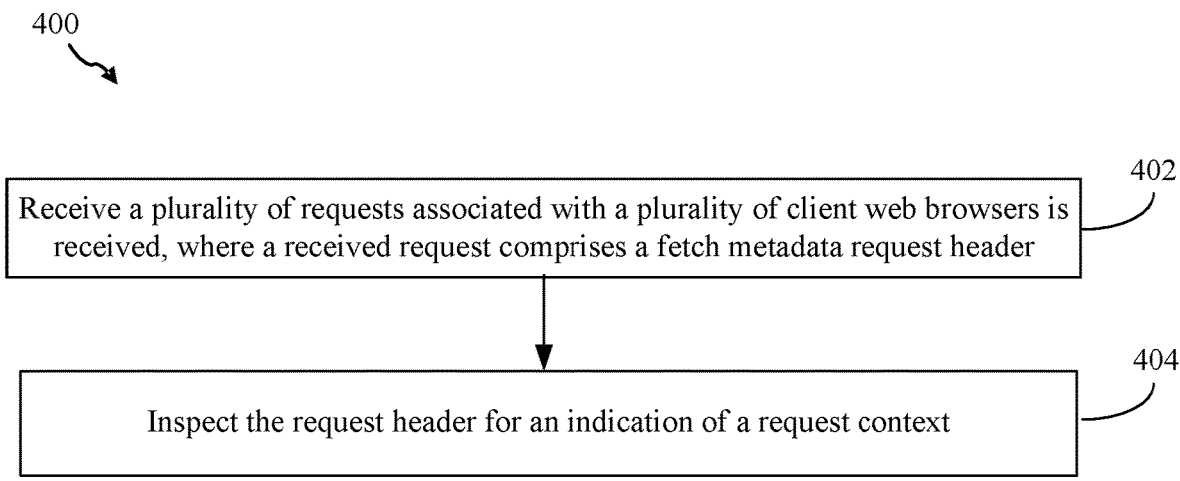
FIG. 4 shows a flowchart of a method for request context determination via fetch metadata, according to an example embodiment

FIG. 4 shows a flowchart of a method 400 for request context determination via fetch metadata, according to an example embodiment. Embodiments disclosed herein and other embodiments may operate in accordance with example method 400. Method 400 comprises steps 402 and 404. However, other embodiments may operate according to other methods. Other structural and operational embodiments will be apparent to persons skilled in the relevant art(s) based on the foregoing discussion of embodiments. There is no requirement that a method embodiment implement all of the steps illustrated in FIG. 4. In various implementations, steps may be added, removed, implemented in the alternative, e.g., in any combination or order. FIG. 4 is simply one of many possible embodiments. Method 400 is described as follows with respect to FIGS. 1 and 2.

As shown in FIG. 4, in step 402, a plurality of requests associated with a plurality of client web browsers is received, where a request comprises a fetch metadata request header and at least one of the other plurality of requests does not comprise a fetch metadata request header. As described above, a plurality of requests (e.g., requests 130 of FIG. 1) associated with client web browsers (e.g., web browser(s) 112) may be received, where one or more of the received requests includes a fetch metadata request header and one or more of the other plurality of requests may not comprise a fetch metadata request header. An initial request may be an HTML request without context markings. Subsequent requests (e.g., made based on a marked response) may be HTML or another type of request from the browser. A request may include a fetch metadata request header. A fetch metadata request header may be an HTTP request header that provides information about the context from which the request originated, which may allow proxy server(s) 104 to detect and/or indicate context, such as the source and/or use of a request. Request Header Contextualizer 208 may (e.g., be configured to) receive mixed requests with and without fetch metadata request headers.

In step 404, an indication in the fetch metadata request header is mapped to the restricted context or to an unrestricted context. In an embodiment, if a request includes a fetch metadata request header, Request Header Contextualizer 208 of FIG. 2 may map the value of the sec-fetch-dest request header into an appropriate context that may otherwise be indicated by Request Header Contextualizer 208 in a proxy response that pre-marks context for subsequent requests.

III. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SOC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 5:
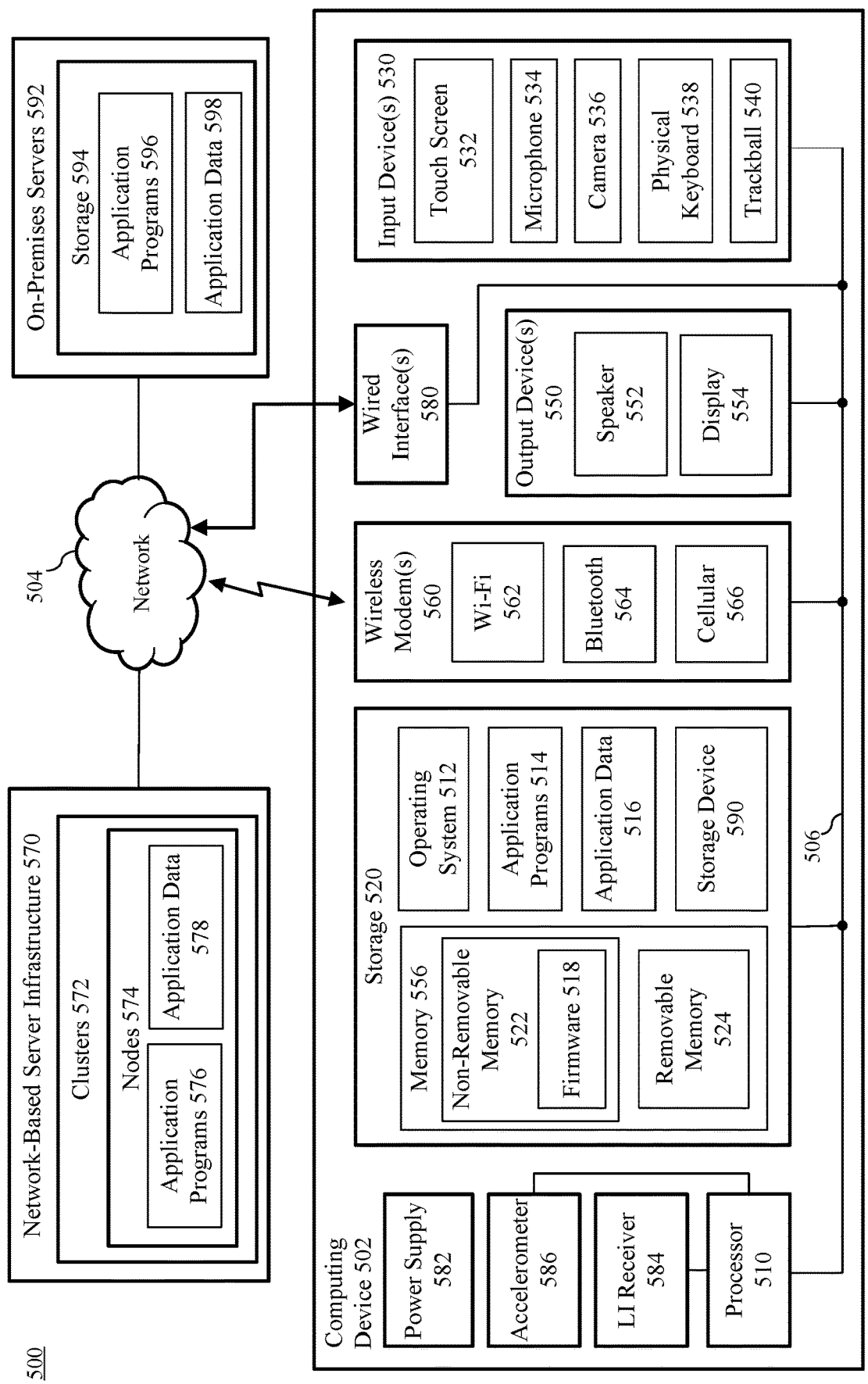
FIG. 5 shows a block diagram of an example computing device that may be used to implement example embodiments.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 5. FIG. 5 shows a block diagram of an exemplary computing environment 500 that includes a computing device 502. Computing device 502 is an example of computing device 102 of FIG. 1, which may include one or more of the components of computing device 502. In some embodiments, computing device 502 is communicatively coupled with devices (not shown in FIG. 5) external to computing environment 500 via network 504. Network 504 comprises one or more networks such as local area networks (LANs), wide area networks (WANs), enterprise networks, the Internet, etc., and may include one or more wired and/or wireless portions. Network 504 may additionally or alternatively include a cellular network for cellular communications. Computing device 502 is described in detail as follows Computing device 502 can be any of a variety of types of computing devices. For example, computing device 502 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 502 may alternatively be a stationary computing device such as a desktop computer, a personal computer (PC), a stationary server device, a minicomputer, a mainframe, a supercomputer, etc.

As shown in FIG. 5, computing device 502 includes a variety of hardware and software components, including a processor 510, a storage 520, one or more input devices 530, one or more output devices 550, one or more wireless modems 560, one or more wired interfaces 580, a power supply 582, a location information (LI) receiver 584, and an accelerometer 586. Storage 520 includes memory 556, which includes non-removable memory 522 and removable memory 524, and a storage device 590. Storage 520 also stores an operating system 512, application programs 514, and application data 516. Wireless modem(s) 560 include a Wi-Fi modem 562, a Bluetooth modem 564, and a cellular modem 566. Output device(s) 550 includes a speaker 552 and a display 554. Input device(s) 530 includes a touch screen 532, a microphone 534, a camera 536, a physical keyboard 538, and a trackball 540. Not all components of computing device 502 shown in FIG. 5 are present in all embodiments, additional components not shown may be present, and any combination of the components may be present in a particular embodiment. These components of computing device 502 are described as follows.

A single processor 510 (e.g., central processing unit (CPU), microcontroller, a microprocessor, signal processor, ASIC (application specific integrated circuit), and/or other physical hardware processor circuit) or multiple processors 510 may be present in computing device 502 for performing such tasks as program execution, signal coding, data processing, input/output processing, power control, and/or other functions. Processor 510 may be a single-core or multi-core processor, and each processor core may be single-threaded or multithreaded (to provide multiple threads of execution concurrently). Processor 510 is configured to execute program code stored in a computer readable medium, such as program code of operating system 512 and application programs 514 stored in storage 520. Operating system 512 controls the allocation and usage of the components of computing device 502 and provides support for one or more application programs 514 (also referred to as "applications" or "apps"). Application programs 514 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 502 can communicate with any other component according to function, although not all connections are shown for ease of illustration. For instance, as shown in FIG. 5, bus 506 is a multiple signal line communication medium (e.g., conductive traces in silicon, metal traces along a motherboard, wires, etc.) that may be present to communicatively couple processor 510 to various other components of computing device 502, although in other embodiments, an alternative bus, further buses, and/or one or more individual signal lines may be present to communicatively couple components. Bus 506 represents one or more of any of several types of bus structures, including a memory bus or memory controller, a peripheral bus, an accelerated graphics port, and a processor or local bus using any of a variety of bus architectures.

Storage 520 is physical storage that includes one or both of memory 556 and storage device 590, which store operating system 512, application programs 514, and application data 516 according to any distribution. Non-removable memory 522 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 522 may include main memory and may be separate from or fabricated in a same integrated circuit as processor 510. As shown in FIG. 5, non-removable memory 522 stores firmware 518, which may be present to provide low-level control of hardware. Examples of firmware 518 include BIOS (Basic Input/Output System, such as on personal computers) and boot firmware (e.g., on smart phones). Removable memory 524 may be inserted into a receptacle of or otherwise coupled to computing device 502 and can be removed by a user from computing device 502. Removable memory 524 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 590 may be present that are internal and/or external to a housing of computing device 502 and may or may not be removable. Examples of storage device 590 include a hard disk drive, a SSD, a thumb drive (e.g., a USB (Universal Serial Bus) flash drive), or other physical storage device.

One or more programs may be stored in storage 520. Such programs include operating system 512, one or more application programs 514, and other program modules and program data. Examples of such application programs may include, for example, computer program logic (e.g., computer program code/instructions) for implementing one or more of multi-layer context detector 114/202, interface 204, parser 206, request header contextualizer 208, request context policy enforcer 10, response header contextualizer 212, response body contextualizer 214, and/or injected code, along with any components and/or subcomponents thereof, as well as the flowcharts/flow diagrams (e.g., method 300) described herein, including portions thereof, and/or further examples described herein.

Storage 520 also stores data used and/or generated by operating system 512 and application programs 514 as application data 516. Examples of application data 516 include web pages, text, images, tables, sound files, video data, and other data, which may also be sent to and/or received from one or more network servers or other devices via one or more wired or wireless networks. Storage 520 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 502 through one or more input devices 530 and may receive information from computing device 502 through one or more output devices 550. Input device(s) 530 may include one or more of touch screen 532, microphone 534, camera 536, physical keyboard 538 and/or trackball 540 and output device(s) 550 may include one or more of speaker 552 and display 554. Each of input device(s) 530 and output device(s) 550 may be integral to computing device 502 (e.g., built into a housing of computing device 502) or external to computing device 502 (e.g., communicatively coupled wired or wirelessly to computing device 502 via wired interface(s) 580 and/or wireless modem(s) 560). Further input devices 530 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 554 may display information, as well as operating as touch screen 532 by receiving user commands and/or other information (e.g., by touch, finger gestures, virtual keyboard, etc.) as a user interface. Any number of each type of input device(s) 530 and output device(s) 550 may be present, including multiple microphones 534, multiple cameras 536, multiple speakers 552, and/or multiple displays 554.

One or more wireless modems 560 can be coupled to antenna(s) (not shown) of computing device 502 and can support two-way communications between processor 510 and devices external to computing device 502 through network 504, as would be understood to persons skilled in the relevant art(s). Wireless modem 560 is shown generically and can include a cellular modem 566 for communicating with one or more cellular networks, such as a GSM network for data and voice communications within a single cellular network, between cellular networks, or between the mobile device and a public switched telephone network (PSTN). Wireless modem 560 may also or alternatively include other radio-based modem types, such as a Bluetooth modem 564 (also referred to as a "Bluetooth device") and/or Wi-Fi 562 modem (also referred to as a "wireless adaptor"). Wi-Fi modem 562 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 564 is configured to communicate with another Bluetooth-capable device according to the Bluetooth short-range wireless technology standard(s) such as IEEE 802.15.1 and/or managed by the Bluetooth Special Interest Group (SIG).

Computing device 502 can further include power supply 582, LI receiver 584, accelerometer 586, and/or one or more wired interfaces 580. Example wired interfaces 580 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 580 of computing device 502 provide for wired connections between computing device 502 and network 504, or between computing device 502 and one or more devices/peripherals when such devices/peripherals are external to computing device 502 (e.g., a pointing device, display 554, speaker 552, camera 536, physical keyboard 538, etc.). Power supply 582 is configured to supply power to each of the components of computing device 502 and may receive power from a battery internal to computing device 502, and/or from a power cord plugged into a power port of computing device 502 (e.g., a USB port, an A/C power port). LI receiver 584 may be used for location determination of computing device 502 and may include a satellite navigation receiver such as a Global Positioning System (GPS) receiver or may include other type of location determiner configured to determine location of computing device 502 based on received information (e.g., using cell tower triangulation, etc.). Accelerometer 586 may be present to determine an orientation of computing device 502.

Note that the illustrated components of computing device 502 are not required or all-inclusive, and fewer or greater numbers of components may be present as would be recognized by one skilled in the art. For example, computing device 502 may also include one or more of a gyroscope, barometer, proximity sensor, ambient light sensor, digital compass, etc. Processor 510 and memory 556 may be co-located in a same semiconductor device package, such as being included together in an integrated circuit chip, FPGA, or system-on-chip (SOC), optionally along with further components of computing device 502.

In embodiments, computing device 502 is configured to implement any of the above-described features of flowcharts herein. Computer program logic for performing any of the operations, steps, and/or functions described herein may be stored in storage 520 and executed by processor 510.

In some embodiments, server infrastructure 570 may be present in computing environment 500 and may be communicatively coupled with computing device 502 via network 504. Server infrastructure 570, when present, may be a network-accessible server set (e.g., a cloud-based environment or platform). As shown in FIG. 5, server infrastructure 570 includes clusters 572. Each of clusters 572 may comprise a group of one or more compute nodes and/or a group of one or more storage nodes. For example, as shown in FIG. 5, cluster 572 includes nodes 574. Each of nodes 574 are accessible via network 504 (e.g., in a "cloud-based" embodiment) to build, deploy, and manage applications and services. Any of nodes 574 may be a storage node that comprises a plurality of physical storage disks, SSDs, and/or other physical storage devices that are accessible via network 504 and are configured to store data associated with the applications and services managed by nodes 574. For example, as shown in FIG. 5, nodes 574 may store application data 578.

Each of nodes 574 may, as a compute node, comprise one or more server computers, server systems, and/or computing devices. For instance, a node 574 may include one or more of the components of computing device 502 disclosed herein. Each of nodes 574 may be configured to execute one or more software applications (or "applications") and/or services and/or manage hardware resources (e.g., processors, memory, etc.), which may be utilized by users (e.g., customers) of the network-accessible server set. For example, as shown in FIG. 5, nodes 574 may operate application programs 576. In an implementation, a node of nodes 574 may operate or comprise one or more virtual machines, with each virtual machine emulating a system architecture (e.g., an operating system), in an isolated manner, upon which applications such as application programs 576 may be executed.

In an embodiment, one or more of clusters 572 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 572 may be a datacenter in a distributed collection of datacenters. In embodiments, exemplary computing environment 500 comprises part of a cloud-based platform such as Amazon Web Services® of Amazon Web Services, Inc. or Google Cloud Platform™ of Google LLC, although these are only examples and are not intended to be limiting.

In an embodiment, computing device 502 may access application programs 576 for execution in any manner, such as by a client application and/or a browser at computing device 502. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 502 may additionally and/or alternatively synchronize copies of application programs 514 and/or application data 516 to be stored at network-based server infrastructure 570 as application programs 576 and/or application data 578. For instance, operating system 512 and/or application programs 514 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 520 at network-based server infrastructure 570.

In some embodiments, on-premises servers 592 may be present in computing environment 500 and may be communicatively coupled with computing device 502 via network 504. On-premises servers 592, when present, are hosted within an organization's infrastructure and, in many cases, physically onsite of a facility of that organization. On-premises servers 592 are controlled, administered, and maintained by IT (Information Technology) personnel of the organization or an IT partner to the organization. Application data 598 may be shared by on-premises servers 592 between computing devices of the organization, including computing device 502 (when part of an organization) through a local network of the organization, and/or through further networks accessible to the organization (including the Internet). Furthermore, on-premises servers 592 may serve applications such as application programs 596 to the computing devices of the organization, including computing device 502. Accordingly, on-premises servers 592 may include storage 594 (which includes one or more physical storage devices such as storage disks and/or SSDs) for storage of application programs 596 and application data 598 and may include one or more processors for execution of application programs 596. Still further, computing device 502 may be configured to synchronize copies of application programs 514 and/or application data 516 for backup storage at on-premises servers 592 as application programs 596 and/or application data 598.

Embodiments described herein may be implemented in one or more of computing device 502, network-based server infrastructure 570, and on-premises servers 592. For example, in some embodiments, computing device 502 may be used to implement systems, clients, or devices, or components/subcomponents thereof, disclosed elsewhere herein. In other embodiments, a combination of computing device 502, network-based server infrastructure 570, and/or on-premises servers 592 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 520. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 514) may be stored in storage 520. Such computer programs may also be received via wired interface(s) 580 and/or wireless modem(s) 560 over network 504. Such computer programs, when executed or loaded by an application, enable computing device 502 to implement features of embodiments discussed herein. Accordingly, such computer programs represent controllers of the computing device 502.

Embodiments are also directed to computer program products comprising computer code or instructions stored on any computer-readable medium or computer-readable storage medium. Such computer program products include the physical storage of storage 520 as well as further physical storage types.

IV. Further Example Embodiments

Methods, systems and computer program products are provided for multi-layer, browser-based context emulation detection, which may be implemented by a proxy for (e.g., unmanaged) browsers. A policy may be enforced against requests if a request context indicates a restricted context (e.g., a download action rather than a webpage rendering). Context may be detected and indicated in a response header and body based on one or more context detection/indication rules. Context may be indicated by marking or not marking resources indicated in responses. Code (e.g., JavaScript library) may be injected to cause the client web browser to indicate context (e.g., for dynamically generated request content and/or requests intercepted by service workers). A response may be forwarded to the client with a response header context, a response body context, and/or injected code, which a client browser may process to generate a request with one or more indications of request context.

In examples, a computing device may include a proxy server. The proxy server may comprise, for example, an interface and a multi-layer browser context detector. The interface may be configured to receive a request associated with a client web browser (e.g., an original request or a subsequent request, which may be generated from a previously marked response). A request may include a request header and a request body. The interface may be configured to receive a response associated with a web server. A response may include a response header and a response body. The multi-layer browser context detector may be configured to: inspect (e.g., review) the request header for an indication of a request context; enforce a policy against the request if the indication of the request context indicates a restricted context; inspect (e.g., review) the response header and the response body for a response header context and a response body context; determine whether to mark (e.g., label, edit, modify) the response header (e.g., e.g., location response header) to indicate the response header context based at least on context detection rules; and determine whether to mark (e.g., label, edit, modify) (e.g., a URL in) the response body to indicate the response body context based at least on the context detection rules. The interface may be configured to forward to the client a response indicating (e.g., by marking or not marking) at least one of the response header context or the response body context.

In examples, at least one of the response header context or the response body context may indicate (e.g., by marking or not marking) the restricted context. At least one of the response header context or the response body context may indicate (e.g., by marking or not marking) an unrestricted context.

In examples, the restricted context may indicate a download action. The unrestricted context may indicate a webpage rendering resource.

In examples, the unrestricted context in the response header context may indicate (e.g., by marking or not marking) whether a navigation response header in the response corresponds to a navigate resource. The unrestricted context in the response body context may indicate (e.g., by marking or not marking) whether resource indicators in the response correspond to hypertext markup language (HTML) resources, JavaScript resources, style sheet resources, or image resources.

In examples, the request may be created based at least on (e.g., subsequent to, responsive to) the forwarded response (e.g., request context derived from the response header/body context).

In examples, the proxy server may (e.g., further) comprise a code injector configured to inject code (e.g., proxy JavaScript code, a library) into the forwarded response. The injected code may be configured to cause the client web browser to mark the request with at least a portion of the request context (e.g., subsequently interpreted in a request generated by the browser after receiving a marked response).

In examples, the injected code may be configured to cause the client web browser to mark the request with at least a portion of the request context for dynamically generated request content (e.g., dynamically created HTML tags for JavaScript (JS) document object model (DOM) manipulation).

In examples, the injected code may be configured to cause the client web browser to mark the request with at least a portion of the request context if the request is captured by a client-side service worker (e.g., for JS non-DOM manipulation).

In examples, the interface may be (e.g., further) configured to: receive a plurality of requests associated with a plurality of client web browsers, including the request. The request may include a fetch metadata request header while at least one of the other plurality of requests does not comprise a fetch metadata request header. The interface may be configured to map an indication (e.g., value) in the fetch metadata request header to the restricted context or to an unrestricted context.

In examples, the client may be an unmanaged client, e.g., in contrast to a managed/controlled client.

In examples, a computer-implemented method may comprise receiving a request associated with a client web browser, the request comprising a request header and a request body; inspecting the request header for an indication of a request context; enforcing a policy against the request if the indication of the request context indicates a restricted context; receiving a response associated with a web server, the response comprising a response header and a response body; inspecting the response header and the response body for a response header context and a response body context; determining based at least on context detection rules whether to: mark the response header to indicate the response header context; mark the response body to indicate the response body context based at least on the context detection rules; and/or inject code into the forwarded response, where the injected code may be configured to cause the client web browser to mark the request with at least a portion of the request context; and forwarding to the client a response indicating at least one of the response header context, the response body context, or including the injected code.

In examples, at least one of the response header context or the response body context may indicate, by marking or not marking, a download action; and at least one of the response header context or the response body context may indicate, by marking or not marking, a webpage rendering resource.

In examples, the header context may indicate whether a navigation response header in the response corresponds to a navigate resource; and the response body context may indicate whether resource indicators in the response correspond to hypertext markup language (HTML) resources, JavaScript resources, style sheet resources, or image resources.

In examples, the injected code may be configured to cause the client web browser to mark the request with at least a portion of the request context for dynamically generated request content.

In examples, the injected code may be configured to cause the client web browser to mark the request with at least a portion of the request context if the request is captured by a client-side service worker.

In examples, a method may (e.g., further) comprise receiving a plurality of requests associated with a plurality of client web browsers, including the request, where the request comprises a fetch metadata request header and at least one of the other plurality of requests does not comprise a fetch metadata request header; and mapping an indication in the fetch metadata request header to the restricted context or to an unrestricted context.

In examples, a computer-readable storage medium may have program instructions recorded thereon that, when executed by a processing circuit, perform a method. The method may comprise receiving a request associated with a client web browser, the request comprising a request header and a request body; inspecting the request header for an indication of a request context; enforcing a policy against the request if the indication of the request context indicates a restricted context; receiving a response associated with a web server, the response comprising a response header and a response body; inspecting the response header and the response body for a response header context and a response body context; determining based at least on context detection rules whether to: mark the response header to indicate the response header context; mark the response body to indicate the response body context based at least on the context detection rules; and/or inject code into the forwarded response, wherein the injected code is configured to cause the client web browser to mark the request with at least a portion of the request context; and forwarding to the client a response indicating at least one of the response header context, the response body context, or including the injected code.

In examples, at least one of the response header context or the response body context may indicate, by marking or not marking, a download action; and at least one of the response header context or the response body context may indicate, by marking or not marking, a webpage rendering resource.

In examples, the header context may indicate whether a navigation response header in the response corresponds to a navigate resource; and the response body context may indicate whether resource indicators in the response correspond to hypertext markup language (HTML) resources, JavaScript resources, style sheet resources, or image resources.

In examples, the method may (e.g., further) comprise receiving a plurality of requests associated with a plurality of client web browsers, including the request, where the request comprises a fetch metadata request header and at least one of the other plurality of requests does not comprise a fetch metadata request header; and mapping an indication in the fetch metadata request header to the restricted context or to an unrestricted context.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computing device that includes a proxy server, the proxy server comprising:
   a processor; and
   a memory device that stores program code structured to cause the processor to:
      receive a request associated with a client web browser, the request comprising a request header and a request body;
      receive a response associated with a web server, the response comprising a response header and a response body, the response header indicating a response header context and the response body indicating a response body context;
      inspect the response header for the response header context;

inspect the response body for the response body context;
determine, based at least on context detection rules, whether to mark the response header to indicate the response header context;
determine, based at least on the context detection rules, whether to mark the response body to indicate the response body context; and
forward to the client a response indicating at least one of the response header context or the response body context.

2. The computing device of claim 1,
wherein at least one of the response header context or the response body context indicates the restricted context; and
wherein at least one of the response header context or the response body context indicates an unrestricted context.

3. The computing device of claim 2,
wherein the restricted context indicates a download action; and
wherein the unrestricted context indicates a webpage rendering resource.

4. The computing device of claim 2,
wherein the unrestricted context in the response header context indicates whether a navigation response header in the response corresponds to a navigate resource; and
wherein the unrestricted context in the response body context indicates whether resource indicators in the response correspond to hypertext markup language (HTML) resources, JavaScript resources, style sheet resources, or image resources.

5. The computing device of claim 1, wherein the request is created based at least on the forwarded response.

6. The computing device of claim 1, wherein the program code is further structured to cause the processor to:
inspect the request header for an indication of a request context;
enforce a policy against the request in response to a determination the indication of the request context indicates a restricted context; and
inject code into the forwarded response, wherein the injected code is configured to cause the client web browser to mark the request with at least a portion of the request context.

7. The computing device of claim 6, wherein the injected code is configured to cause the client web browser to mark the request with at least a portion of the request context for dynamically generated request content.

8. The computing device of claim 6, wherein the injected code is configured to cause the client web browser to mark the request with at least a portion of the request context in response to a determination the request is captured by a client-side service worker.

9. The computing device of claim 1, wherein the program code is further structured to cause the processor to:
inspect the request header for an indication of a request context;
enforce a policy against the request in response to a determination the indication of the request context indicates a restricted context;
receive a plurality of requests associated with a plurality of client web browsers, including the request, where the request comprises a fetch metadata request header and at least one of the other plurality of requests does not comprise a fetch metadata request header; and
map an indication in the fetch metadata request header to the restricted context or to an unrestricted context.

10. The computing device of claim 1, wherein the client is an unmanaged client.

11. A computer-implemented method comprising:
receiving a request associated with a client web browser, the request comprising a request header and a request body;
receiving a response associated with a web server, the response comprising a response header and a response body, the response header indicating a response header context and the response body indicating a response body context;
inspecting the response header for the response header context;
inspecting the response body for the response body context;
determining based at least on context detection rules whether to:
mark the response header to indicate the response header context;
mark the response body to indicate the response body context; or
inject code into the response, wherein the injected code is configured to cause the client web browser to mark the request with at least a portion of the request context; and
forwarding to the client a response indicating at least one of the response header context, the response body context, or including the injected code.

12. The computer-implemented method of claim 11,
wherein at least one of the response header context or the response body context indicates, by marking or not marking, a download action; and
wherein at least one of the response header context or the response body context indicates, by marking or not marking, a webpage rendering resource.

13. The computer-implemented method of claim 11,
wherein the header context indicates whether a navigation response header in the response corresponds to a navigate resource; and
wherein the response body context indicates whether resource indicators in the response correspond to hypertext markup language (HTML) resources, JavaScript resources, style sheet resources, or image resources.

14. The computer-implemented method of claim 11, further comprising:
inspecting the request header for an indication of a request context; and
enforcing a policy against the request in response to a determination the indication of the request context indicates a restricted context;
wherein the injected code is configured to cause the client web browser to mark the request with at least a portion of the request context for dynamically generated request content.

15. The computer-implemented method of claim 11, further comprising:
inspecting the request header for an indication of a request context; and
enforcing a policy against the request in response to a determination the indication of the request context indicates a restricted context;
wherein the injected code is configured to cause the client web browser to mark the request with at least a portion of the request context in response to a determination the request is captured by a client-side service worker.

16. The computer-implemented method of claim 11, further comprising:
   inspecting the request header for an indication of a request context;
   enforcing a policy against the request in response to a determination the indication of the request context indicates a restricted context;
   receiving a plurality of requests associated with a plurality of client web browsers, including the request, where the request comprises a fetch metadata request header and at least one of the other plurality of requests does not comprise a fetch metadata request header; and
   mapping an indication in the fetch metadata request header to the restricted context or to an unrestricted context.

17. A computer-readable storage medium having program instructions recorded thereon that, when executed by a processing circuit, perform a method comprising:
   receiving a request associated with a client web browser, the request comprising a request header and a request body;
   inspecting the request header for an indication of a request context;
   enforcing a policy against the request in response to a determination the indication of the request context indicates a restricted context;
   receiving a response associated with a web server, the response comprising a response header and a response body, the response header indicating a response header context and the response body indicating a response body context;
   inspecting the response header for the response header context;
   inspecting the response body for the response body context;
   determining based at least on context detection rules to inject code into a forwarded response, wherein the injected code is configured to cause the client web browser to mark the request with at least a portion of the request context; and
   forwarding to the client a response indicating the injected code.

18. The computer-readable storage medium of claim 17, wherein at least one of the response header context or the response body context indicates, by marking or not marking, a download action; and
   wherein at least one of the response header context or the response body context indicates, by marking or not marking, a webpage rendering resource.

19. The computer-readable storage medium of claim 17, wherein the header context indicates whether a navigation response header in the response corresponds to a navigate resource; and
   wherein the response body context indicates whether resource indicators in the response correspond to hypertext markup language (HTML) resources, JavaScript resources, style sheet resources, or image resources.

20. The computer-readable storage medium of claim 17, the method further comprising:
   receiving a plurality of requests associated with a plurality of client web browsers, including the request, where the request comprises a fetch metadata request header and at least one of the other plurality of requests does not comprise a fetch metadata request header; and mapping an indication in the fetch metadata request header to the restricted context or to an unrestricted context.

* * * * *